(12) United States Patent
Beadle et al.

(10) Patent No.: US 7,830,537 B2
(45) Date of Patent: Nov. 9, 2010

(54) SYSTEM AND METHOD FOR CONTROLLING COPYING OF DOCUMENTS

(75) Inventors: Bruce A. Beadle, Round Rock, TX (US); Michael A. Paolini, Austin, TX (US); Colin J. Parris, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1357 days.

(21) Appl. No.: 11/315,380

(22) Filed: Dec. 21, 2005

(65) Prior Publication Data

US 2007/0139723 A1 Jun. 21, 2007

(51) Int. Cl.
*G06K 15/00* (2006.01)
*G06K 9/54* (2006.01)
*G06K 9/60* (2006.01)
*G06F 3/12* (2006.01)
*G03G 21/00* (2006.01)

(52) U.S. Cl. .................. 358/1.14; 358/1.15; 382/165; 382/306; 399/366

(58) Field of Classification Search ............... 358/448, 358/1.9, 1.13, 1.14, 1.15, 474; 382/306; 399/366
See application file for complete search history.

(56) References Cited

U.S. PATENT DOCUMENTS

| 4,414,579 | A | | 11/1983 | Dattilo et al. |
| 5,444,779 | A | * | 8/1995 | Daniele ............... 399/366 |
| 5,798,844 | A | * | 8/1998 | Sakano et al. ........... 358/405 |
| 6,175,714 | B1 | | 1/2001 | Crean |
| 6,553,136 | B1 | * | 4/2003 | Keshet et al. ........... 382/135 |
| 6,901,236 | B2 | * | 5/2005 | Saitoh et al. ........... 399/366 |
| 2001/0017717 | A1 | * | 8/2001 | Ishida et al. ........... 358/464 |
| 2001/0025343 | A1 | | 9/2001 | Chrisop et al. |
| 2002/0181006 | A1 | | 12/2002 | Chrisop et al. |
| 2003/0098345 | A1 | * | 5/2003 | Kobayashi et al. ........ 235/375 |
| 2003/0145218 | A1 | | 7/2003 | Hutchison |
| 2004/0190078 | A1 | | 9/2004 | Lebo et al. |

* cited by examiner

*Primary Examiner*—James A Thompson
(74) *Attorney, Agent, or Firm*—The Brevetto Law Group

(57) ABSTRACT

A system and method of controlling copying of documents. The method includes optically capturing a document. At least one object of the captured document is recognized. A content output is determined based on the recognized object and at least one output rule. The content output is provided based on the determination.

20 Claims, 3 Drawing Sheets

SYSTEM AND METHOD FOR CONTROLLING COPYING OF DOCUMENTS

TECHNICAL FIELD OF THE INVENTION

The present invention relates generally to xerography and in particular to the control of document copying.

BACKGROUND OF THE INVENTION

Unauthorized copying of sensitive information has occurred since man has been storing and tracking information on documents. Combating document fraud and especially protecting printed content is a multidisciplinary and international concern. The constant improvement of modern scanners with digital means of signal processing and color copiers has made it economically feasible to reproduce almost perfect looking reproductions of currency and fraudulent travel documents. This same technology is now used every day to easily copy printed information for nefarious reasons.

Many different security printing techniques have been developed to alert a casual observer of a copy attempt at the time of general inspection. These technologies are referred to in general terms as "copy evident" because the photocopy is produced with a warning message. While these "copy evident" techniques might provide some level of warning on a copy, they do not however stop a criminal from identifying, copying and sharing valuable private information.

Years ago, copiers used to be manufactured in a way as to black-out the copies if they encountered a red 'CONFIDENTIAL' on the document. The black-out was achieved by tuning a lamp so as to cause a reflection of the color red. This technology quickly became obsolete as some tried to detune to lamp.

In accordance with various copy protection techniques, a hidden warning message, such as 'VOID' or 'COPY', is printed in a halftone within a halftone background on a substrate. The line screen value of the hidden warning message is selected so that the elements of the hidden warning message are reproduced when photocopied. The line screen value of the background, however, is selected, such that the elements of the background are much smaller and would not easily reproduce when photocopied. As a result, and in theory, the hidden warning message will appear on duplicates of the original document made by photocopying. This method is also sometimes used by reversing the screen values of the hidden warning message and the background, such that the elements of the hidden warning message are not reproduced, and the elements of the background are reproduced when photocopied or scanned.

While the above techniques have provided some degree of copy-evident protection of original documents with respect to most copiers, in recent years digital scanners and color copiers continue to improve both their resolution and digital filtering capabilities substantially. These new color copiers and scanners can reproduce at a very high resolution of 600×1200 or higher and have made the above techniques less effective in protecting original documents.

In most cases the hidden warning message does not readily appear on the reproduction of the original document, so that a casual observer of the document may not be alerted that the document in possession is not the original. A greater element disparity between the respective line screen values and tonal screen values of the hidden warning message and background pattern would allow the hidden warning message to appear on a reproduction of the original document even with the manipulation of the copier. Due to this disparity, however, most presently known camouflage techniques may not adequately suppress the visual appearance of the hidden warning message on the original document being rejected as a copy, which would not be acceptable to issuers of the original. Despite the various copy protection technologies known, what is needed is a superior strategy for controlling the distribution of documents and portions thereof.

Therefore, it would be desirable to provide a strategy for controlling copying of documents that would overcome the aforementioned and other disadvantages.

SUMMARY OF THE INVENTION

One aspect of the present invention provides a method of capturing contents of a document. The method includes optically capturing a document. At least one object of the captured document is recognized. A content output is determined based on the recognized object and at least one output rule. The content output is provided based on the determination.

Another aspect of the present invention provides a computer usable medium including a program for controlling copying of documents. The medium includes optically capturing a document, and recognizing at least one object of the captured document. The medium further includes determining a content output based on the recognized object and at least one output rule. The content output is provided based on the determination.

Another aspect of the present invention provides a system for capturing contents of a document. The system includes means for optically capturing a document, and means for recognizing at least one object of the captured document. The system further includes means for determining a content output based on the recognized object and at least one output rule; and means for providing the content output based on the determination.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF THE PRESENTLY PREFERRED EMBODIMENTS

Figure 1:
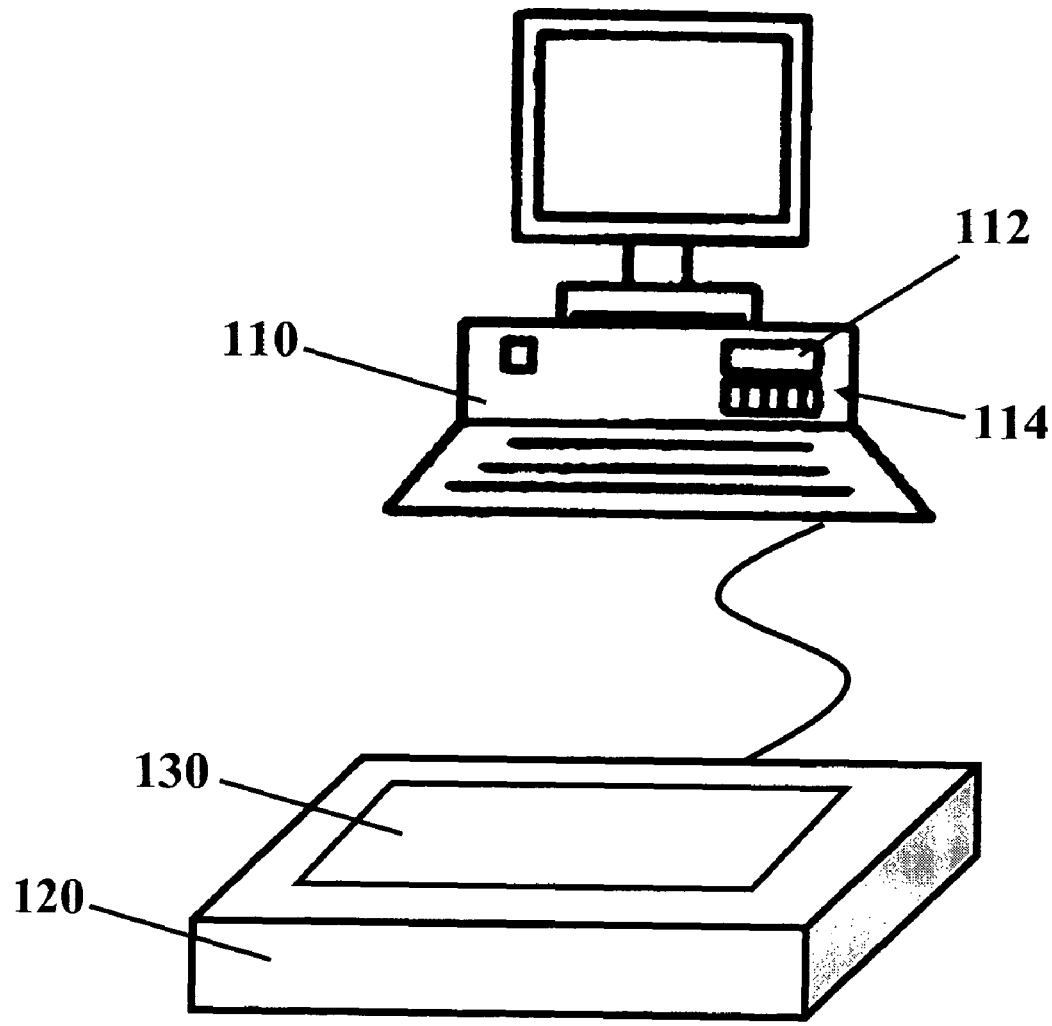
FIG. 1 illustrates a system for controlling copying of documents, in accordance with one embodiment of the present invention.

FIG. 1 illustrates a system for controlling the copying of documents, in accordance with one embodiment of the present invention, and shown generally by numeral 100. System 100 includes a computer 110 linked to a scanner 120. Scanner 120 creates an image into a digital representation of a document 130 position thereon. Computer 110 includes a microprocessor (CPU) that performs the function of a general purpose processor. In one embodiment, processor is implemented as a microcontroller, controller, host processor, or vehicle communications processor. In an example, processor is implemented as an application specific integrated circuit (ASIC). Computer 110 includes a hard drive 112 and memory 114 for storing output copy rules, document, and the like. Those skilled in the art will appreciate that the computer 110, hard drive 112, memory 144, and scanner 120 can reside in different physical locations while still performing the functions in accordance with the present invention. Computer 110 includes at least one database for storing information (e.g., objects, scanned documents, output copy rules, authorization codes, and the like). One or more documents 130 (i.e., certain copier machines include multiple document inputs) are loaded onto the scanner 120 prior to duplication.

As used herein, the term "object" refers to a variety of symbols, letters, words, (portions of) images, pictures, icons, watermarks, pictographs, barcodes, logos, designs, figures, markings, color schemes, characters, graphics, elements, layouts (e.g., formatting, white space usage, word and sentence spacing, capitalization patterns, and watermarks), and the like. Examples of objects are "DO NOT COPY", "CONFIDENTIAL", "FOR OFFICE USE ONLY", etc. Although the present invention is described primarily in the context of a scanner, those skilled in the art will appreciate that the present invention described herein can be applied to other devices. Such devices include FAX machines, copiers, and any other device for digitally capturing a document into an image or a file for reproduction, archiving, or other purposes. In addition, the teachings of the present invention can be applied to technology used for the dissemination of images such as printers, copiers, email, and the like.

Figure 2A:
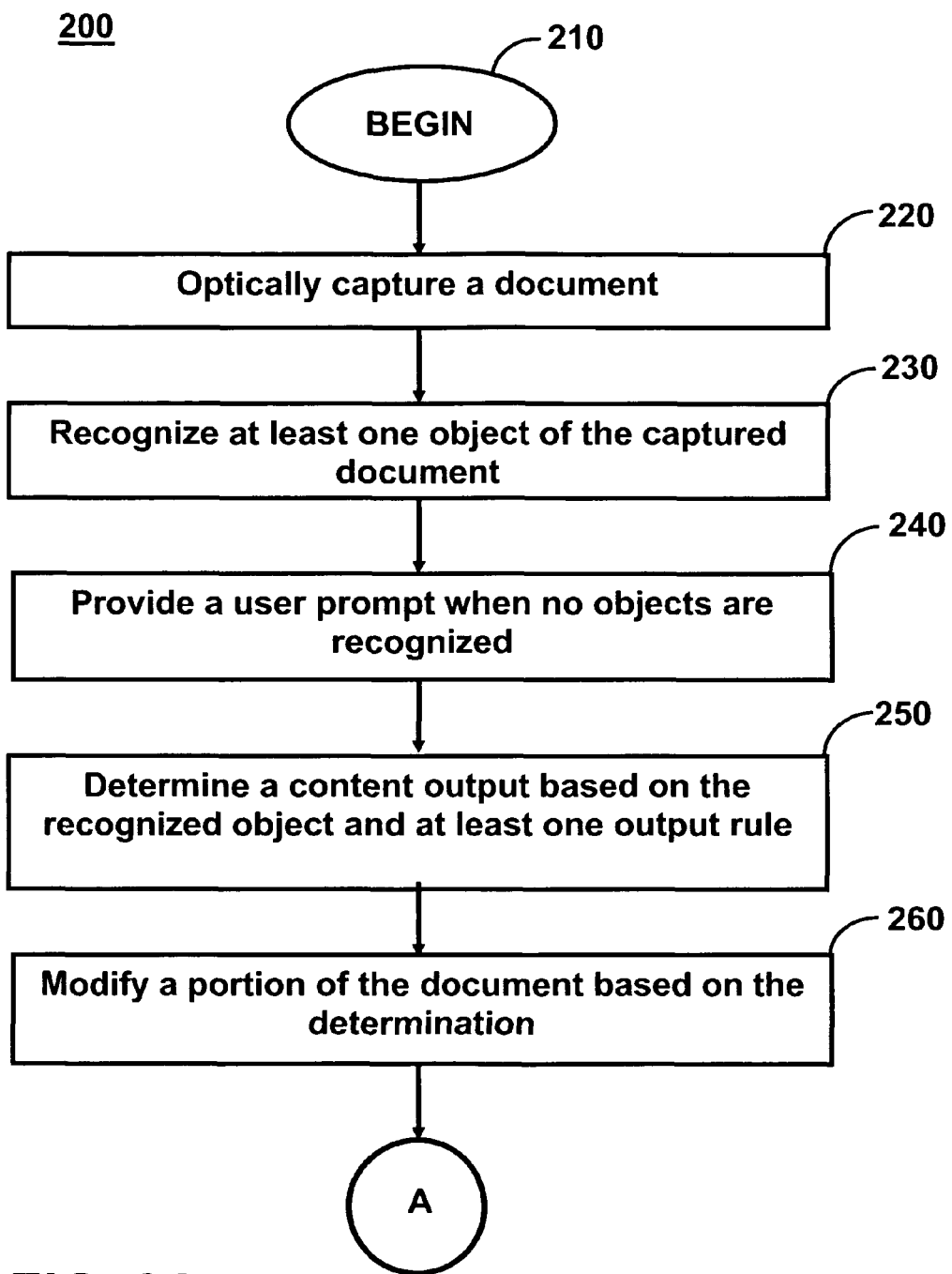
FIGS. 2A and 2B illustrate a flow chart of a method of controlling copying of documents, in accordance with one embodiment of the present invention.
Figure 2B:
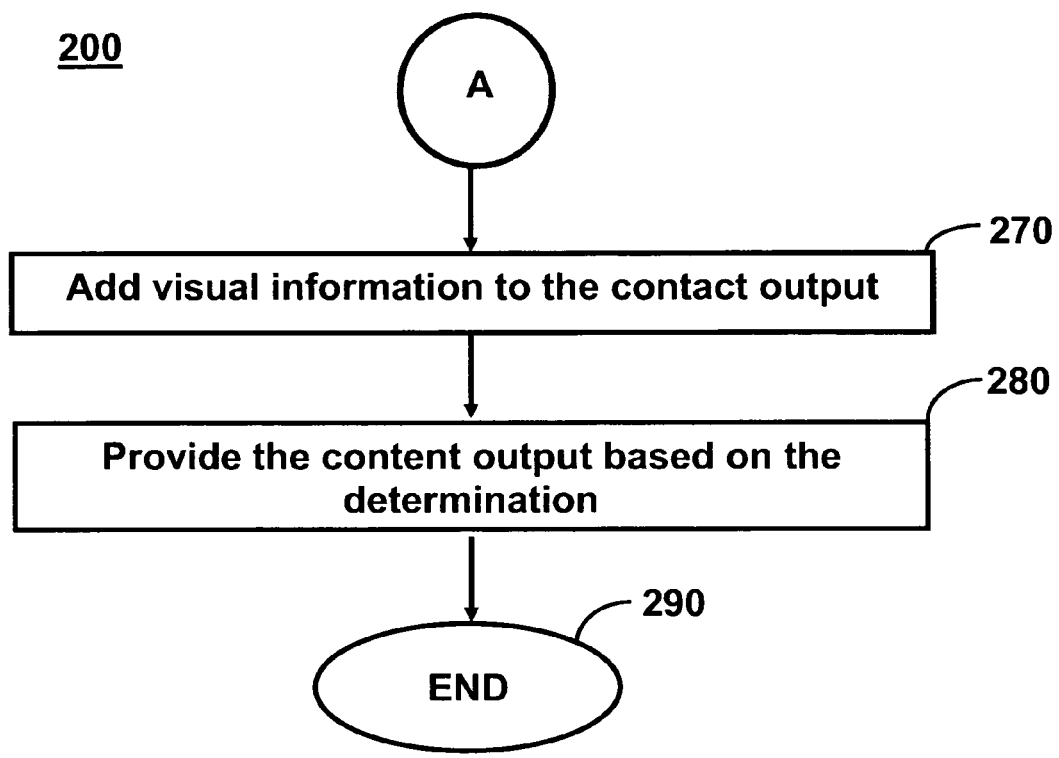

FIGS. 2A and 2B illustrate a flowchart 200 representative of one embodiment of a method of controlled copying of documents. Method 200 begins at 210. The present invention can take the form of a computer usable medium including a program for capturing, processing, and manipulating a document in accordance with the present invention. The program, stored in the computer usable medium, includes computer program code for executing the method steps described and illustrated in FIGS. 2A and 2B.

At step 220, a document is optically captured. In one embodiment, capturing the document is achieved by a photocopier, scanner, camera, and the like. The scanning process involves converting analog information (i.e., the document) into a digital format. Once captured, the digitized information is sent from the scanner 130 to the computer 110 whereby a policy engine applies one or more output copy rules before final output.

At step 230, the captured document is examined in order to recognize at least one object therein. In one embodiment, the object(s) of the captured document are compared to a database of objects by an optical object recognition (OCR) process. The database of objects as well as a policy engine for governing copying rules resides on the computer 110. In another embodiment, the database and policy engine can reside remotely from one another.

At step 240, if no objects are recognizable, in one embodiment, one or more copies of the document can be made freely. In another embodiment, a prompt will appear, for example, querying a user in succession: 1) is the material is copyrighted; 2) is the document being copied for fair use; and 3) is the user aware of a potential violation of rules, laws, and guidelines, and so forth. The user can choose to or not to copy the document based on the response to these questions. If a copy is made against company policy, a supervisor or other personnel can be alerted of this action. The prompt can also appear for a third party such as a librarian, security personnel, supervisor, and the like.

At step 250, if at least one object of the scanned document is recognized, a content output is determined based on the recognized object and at least one output rule. In one embodiment, a policy engine is used to apply numerous rules to the output copy. The rules include, but are not limited to, an output limit rule, copyright and fair-use rules, a notification rule, a rejection rule, a block rule, a payment rule, an authorization rule, and an archiving rule. As used herein, content output is defined as the document to be produced. For example, the content output is the final document after scanning and any manipulations performed thereon.

In one embodiment, the output limit rule refers to a predetermined maximum number of copies that can be made for a given user and/or a given document. For example, only five copies may be allowed of a certain document. In addition, a copy count can be embedded on the final document (i.e., "1 of 5", "2 of 5", and so on. As such, if "5 of 5" appeared on a document, a copy would not be permitted.

In one embodiment, documents that are recognized as copyrighted will not be copied. For fair-use copying, there can be a requirement to optically capture page 1 (or any other page) before allowing copying of other pages, thereby confirming ownership of the document.

In one embodiment, the notification rule relates to, for example, a supervisor (or other person) receiving a notification (e.g., an email) when a user is attempting to make copies of documents, especially unauthorized or protected copies In one embodiment, the rejection rule relates to no copies being produced if a certain object is authenticated. For example, if the words "not for duplication"' are recognized on the document, then any attempt to copy will be rejected. Alternatively, one or more object(s) denoting "do not copy" is/are recognized on the document, to achieve the same.

In one embodiment, the block rule relates to editing, or blacking out, certain privileged information. The area(s) to be blacked out can be predetermined by, for example, a company executive. One approach may be to provide a list of objects that would immediately trigger the block rule. The block rule, for example, can darken out sensitive areas such as diagrams. Finally, sensitive words or images (or the areas and sentences around them) may be blacked out or omitted. Proposed areas for this blackout may be shown to the user on a screen to help adjust the blackout area size and/or location if a display and input is available, and the policy allows such editing actions by a user.

In one embodiment, the payment rule relates to a user paying for copies. In such an embodiment, the user must provide the proper funds for the duplication process. For example, the cost of duplication is based on the recognized objects in one such embodiment.

In one embodiment, the authorization rule relates to providing security clearance. For example, a supervisor (or other person) may receive a notification (e.g., an email) when a user attempts to make copies of documents, especially unauthorized or protected copies. This notification can reduce dissemination of certain sensitive documents. In some embodiments, authorized personnel can override the authorization rule by issuing authorization such as with a code, a key, badge, code, password, fingerprint reader and the like. The provision of different keys allows for proper dissemination of information. For example, a manager may be able to copy a document with the word "salary" while a non-manager may not be able to do so without approval. An executive, however, may be able to copy items that a manager may not.

A network connection facilitates the authorization process, but is not required. If a network connection is present, a digital copy of the requested copy target may be sent to the copying person's manager, or n number of people flagged in a database by word/phrase sequence, for review and/or approval if it contains the a flagged word (printing or copying might be paused or disallowed until approval returned or declined, depending on policy). For sensitive areas, a digital copy might be sent to archiving areas along with the ID and date/time for all copied items.

In one embodiment, an archiving rule allows a scanned document to reside in the hard drive 112 and/or memory 114 until proper authorization is provided for its release.

At step 260, in one embodiment, a portion of the content output can be modified to protect sensitive data. For example, a portion of the content input containing classified secrets can either be masked (e.g., blacked-out) out or erased (e.g., white-out) altogether before dissemination, while non-sensitive information is left unmodified. In one embodiment, masking is achieved by, for example, blacking out all images on a document while leaving the text untouched. In another embodiment, an area of the document can be blacked out within a predetermined boundary. Blacking out is defined as an operation configured to obfuscate visual information. For example, blacking out can be attained either by rendering the area black, out of focus or other similar techniques.

At step 270, visual information such as one or more watermarks, embedded emblems, objects, and stenographic content can be added to the output for identification, security, and other reasons. Additionally, in one embodiment, steganographic content is added to the output. Steganography is known to those skilled in the art.

At step 280, the content output is provided based on the determination. In one embodiment, providing the content output includes displaying, printing, emailing, and other forms of dissemination. The content output can be provided for a single copy or for multiple copy sessions.

The method terminates at step 290 and can be repeated as necessary. It is important to note that the figures and description illustrate specific applications and embodiments of the present invention, and is not intended to limit the scope of the present disclosure or claims to that which is presented therein.

While the figures and description present a program run on a scanner and computer system, the present invention is not limited to that format, and is therefore applicable to other copier formats. Upon reading the specification and reviewing the drawings hereof, it will become immediately obvious to those skilled in the art that myriad other embodiments of the present invention are possible, and that such embodiments are contemplated and fall within the scope of the presently claimed invention.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

It should be noted that both the server and devices can reside behind a firewall, or on a protected node of a private network or LAN connected to a public network such as the Internet. Alternatively, the server and devices can be on opposite sides of a firewall, or connected with a public network such as the Internet. The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device), or a propagation medium such as a carrier wave. Examples of a computer-readable medium include a semiconductor or solid state memory, magnetic tape, a removable computer diskette, a random access memory (RAM), a read-only memory (ROM), a rigid magnetic disk and an optical disk.

The invention claimed is:

1. A method of controlling copying of a document, the method comprising:

optically capturing contents of the document to produce a captured document;

performing optical object recognition on the captured document in an attempt to find a recognized object of the captured document;

providing a first prompt if said optical object recognition does not recognize any object, said first prompt inquiring whether the document is copyrighted;

providing a second prompt if said optical object recognition results in finding said recognized object, said second prompt warning that the document is subject to limitations concerning copying;

comparing the recognized object to objects in an object database if said optical object recognition results in finding said recognized object, wherein each of the objects of said object database is associated with at least one output rule from an output rule database comprising at least three output rules including an authorization rule, a block rule, and a notification rule;

determining a content output for the recognized object based on said at least one output rule associated with the recognized object; and providing the content output based on said at least one output rule.

2. The method of claim 1, wherein the at least one output rule is selected from a group consisting of an output limitation rule, the notification rule, a copyright rule, the authorization rule, an archiving rule, the block rule, a copy number rule, a purchase order rule, a copy order rule, and a fair-use rule.

3. The method of claim 1, further comprising:

modifying a portion of the document in response to the determining of the content output for the recognized object.

4. The method of claim 3, wherein said modifying the portion of the document further comprises:

obfuscating visual information from said portion of the document.

5. The method of claim 1, wherein said modifying the portion of the document further comprises:

adding visual information to the document selected from a group consisting of a watermark, an embedded emblem, one or more words, and steganographic content.

6. The method of claim 1, further comprising:

sending an unauthorized copy alert in response to the determining of the content output for the recognized object.

7. The method of claim 1, the method further comprising:

providing a third prompt following the first prompt inquiring whether the document is being copied for fair use, and providing a fourth prompt inquiring whether the user is aware of a potential violation of rules, laws or guidelines against copying the document.

8. The method of claim 1, wherein the second prompt warns that a portion of the document is subject to being blacked out, the method further comprising:
   displaying a proposed area of the document to be blacked out and prompting for a user input concerning the proposed area.

9. The method of claim 1, wherein the output rule database comprises at least a first output rule based on said recognized object being a symbol associated with a first copying limitation, and a second output rule based on said recognized object being predefined content associated with a second copying limitation.

10. The method of claim 9, wherein said first output rule is based on the symbol being one of a group of symbols consisting of a watermark, a logo, a "DO NOT COPY" label, and a barcode; and
   wherein said second output rule is based on the predefined content being one of a group of contents consisting of predefined content text, capitalization patterns, formatting, and white space usage.

11. A computer program product for controlling copying of a document, the computer program product comprising a computer readable medium including a computer readable program, wherein the computer readable program upon being executed on a computer causes the computer to perform activities comprising:
   optically capturing contents of the document to produce a captured document;
   performing optical object recognition on the captured document in an attempt to find a recognized object of the captured document;
   providing a first prompt if said optical object recognition does not recognize any object, said first prompt inquiring whether the document is copyrighted;
   providing a second prompt if said optical object recognition results in finding said recognized object, said second prompt warning that the document is subject to limitations concerning copying;
   comparing the recognized object to objects in an object database if said optical object recognition results in finding said recognized object, wherein each of the objects of said object database is associated with at least one output rule from an output rule database comprising at least three output rules including an authorization rule, a block rule, and a notification rule;
   determining a content output for the recognized object based on said at least one output rule associated with the recognized object; and
   providing the content output based on said at least one output rule.

12. The computer program product of claim 11, wherein the at least one output rule is selected from a group consisting of an output limitation rule, the notification rule, a copyright rule, the authorization rule, an archiving rule, the block rule, a copy number rule, a purchase order rule, a copy order rule, and a fair-use rule.

13. The computer program product of claim 11, further comprising:
   modifying a portion of the document in response to the determining of the content output for the recognized object.

14. The computer program product of claim 13, wherein said modifying the portion of the document further comprises:
   obfuscating visual information from said portion of the document.

15. The computer program product of claim 11, wherein said modifying the portion of the document further comprises:
   adding visual information to the document selected from a group consisting of a watermark, an embedded emblem, one or more words, and steganographic content.

16. The computer program product of claim 11, further comprising:
   sending an unauthorized copy alert in response to the determining of the content output for the recognized object.

17. The computer program product of claim 11, the method further comprising:
   providing a third prompt following the first prompt inquiring whether the document is being copied for fair use, and providing a fourth prompt inquiring whether the user is aware of a potential violation of rules, laws or guidelines against copying the document.

18. The computer program product of claim 11, wherein the second prompt warns that a portion of the document is subject to being blacked out, the method further comprising:
   displaying a proposed area of the document to be blacked out and prompting for a user input concerning the proposed area.

19. The computer program product of claim 11, wherein the output rule database comprises at least a first output rule based on said recognized object being a symbol associated with a first copying limitation, and a second output rule based on said recognized object being predefined content associated with a second copying limitation.

20. The computer program product of claim 19, wherein said first output rule is based on the symbol being one of a group of symbols consisting of a watermark, a logo, a "DO NOT COPY" label, and a barcode; and
   wherein said second output rule is based on the predefined content being one of a group of contents consisting of predefined content text, capitalization patterns, formatting, and white space usage.

* * * * *